United States Patent
Myers

[11] Patent Number: 5,709,343
[45] Date of Patent: Jan. 20, 1998

[54] ADJUSTABLE DROP NOZZLE SYSTEM

[76] Inventor: Larry L. Myers, 58385 Hwy. 59, Haxtun, Colo. 80731-9409

[21] Appl. No.: 582,477

[22] Filed: Jan. 3, 1996

[51] Int. Cl.$^6$ ................................................ B05B 3/00
[52] U.S. Cl. ................................. 239/730; 239/732
[58] Field of Search ........................... 239/723, 726, 239/727, 728, 730, 731, 732, 742

[56] References Cited

U.S. PATENT DOCUMENTS

| | | | |
|---|---|---|---|
| 3,608,826 | 9/1971 | Reinke | 239/728 |
| 3,777,979 | 12/1973 | Ririe et al. | 239/730 |
| 3,917,171 | 11/1975 | Reinke | 239/728 |
| 4,277,026 | 7/1981 | Garvey | 239/727 X |
| 4,397,421 | 8/1983 | Schram | 239/731 X |
| 4,763,836 | 8/1988 | Lyle et al. | 239/727 X |

Primary Examiner—Andres Kashnikow
Assistant Examiner—Steven J. Ganey

[57] ABSTRACT

An apparatus attachable to a center pivot irrigation system provides for the raising and lowering of all sprinkler heads simultaneously. The apparatus includes a bar along the length of the system rotatably mounted in brackets attached to the bottom of the existing water supply pipe. Cables from each sprinkler head are wound around and fixed at the other end to the bar, and if several towers are arranged in a line, the bars are joined together with flexible spring couplings to transmit the torque from one bar to the next smoothly even if they are somewhat misaligned. Flexible hoses are used between the sprinkler heads and the water supply line to allow them to lift vertically upwardly or downwardly as the height is adjusted, and such height adjustment is accomplished by rotating the bar to either wind or unwind the sprinkle head support cables as desired.

1 Claim, 3 Drawing Sheets

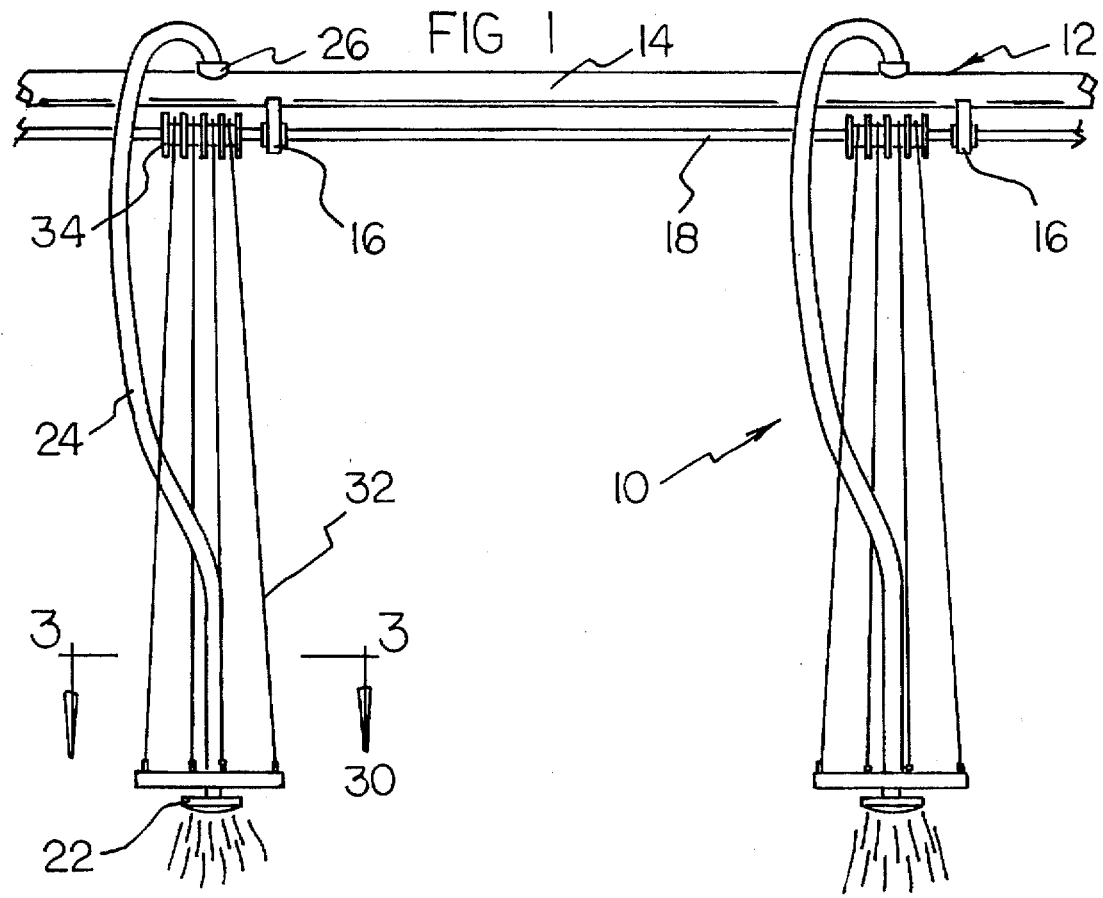
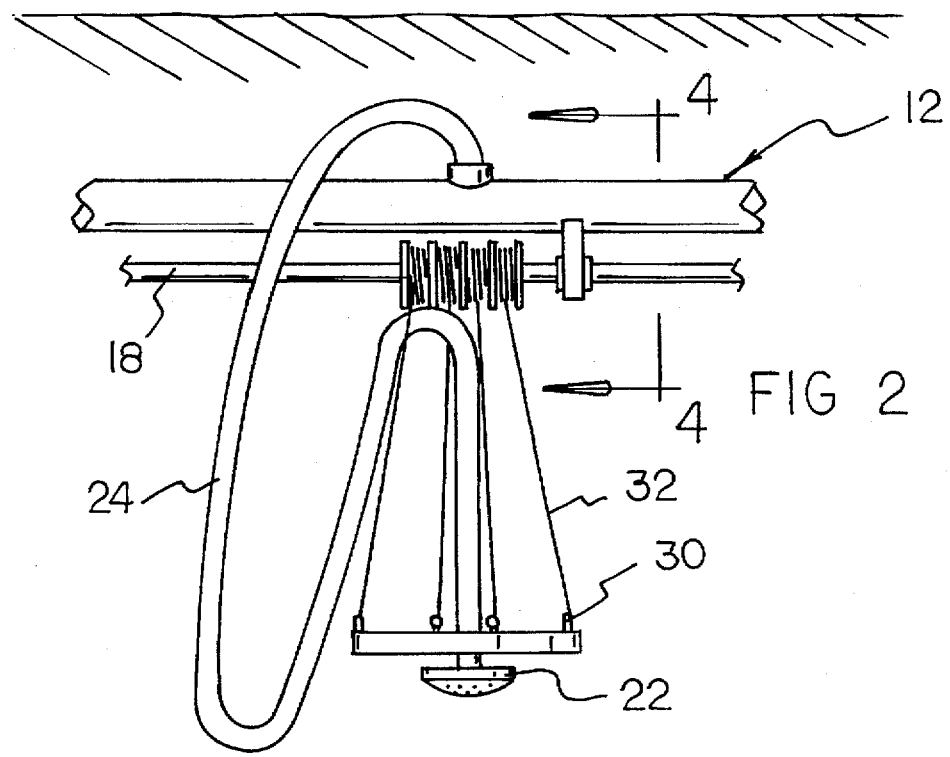

ADJUSTABLE DROP NOZZLE SYSTEM

BACKGROUND OF THE INVENTION

1. Field of the Invention

The present invention relates to agricultural irrigation systems and more particularly pertains to an apparatus for selectively raising and lowering sprinkling heads associated with a center pivot irrigation system.

2. Description of the Prior Art

The use of center pivot irrigation systems is well known in the prior art, and this is evidenced by the granting of a number of patents relating to various functional and structural aspects of such systems. Examples of these center pivot irrigation systems are to be found in U.S. Pat. No. 3,669,353 which issued to Hanson et al, on Jun. 13, 1972 and U.S. Pat. No. 4,202,596 which issued to Knudsen on May 13, 1980.

While each of these prior art patents disclose center pivot irrigation systems which fulfill their respective particular objectives and requirements, and are most likely quite functional for their intended purposes, it will be noticed that neither system discloses any means for selectively raising and lowering the associated sprinkler heads in a simultaneous manner. To the contrary, it becomes necessary to individually raise and lower the sprinkler heads one at a time, and this is a common necessary practice which must be undertaken as a crop grows in height. As such, there apparently still exists the need for improved center pivot irrigation systems wherein a more rapid and efficient manner of raising and lowering sprinkler heads could be accomplished, and in this respect, the present invention substantially fulfills this need.

SUMMARY OF THE INVENTION

In view of the foregoing disadvantages inherent in the known types of adjustable sprinkler heads now present in the prior art, the present invention provides a new adjustable sprinkler head having advantages and improvements which are patentably distinct over similar devices and methods which may already be patented or commercially available. As such, the general purpose of the present invention, which will be described subsequently in greater detail, is to provide a adjustable sprinkler head and method which has many of the advantages of the adjustable sprinkler heads mentioned heretofore while being operable to overcome problems not presently addressed by the prior art.

To attain this, the present invention generally comprises an apparatus attachable to a center pivot irrigation system which provides for the raising and lowering of all sprinkler heads simultaneously. The apparatus includes a bar along the length of the system rotatably mounted in brackets attached to the bottom of the existing water supply pipe. Cables from each sprinkler head are wound around and fixed at the other end to the bar, and if several towers are arranged in a line, the bars are joined together with flexible spring couplings to transmit the torque from one bar to the next smoothly even if they are somewhat misaligned. Flexible hoses are used between the sprinkler heads and the water supply line to allow them to lift vertically upwardly or downwardly as the height is adjusted, and such height adjustment is accomplished by rotating the bar to either wind or unwind the sprinkle head support cables as desired.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new adjustable sprinkler head and method which has many of the advantages of the adjustable sprinkler heads mentioned heretofore and many novel features that result in a adjustable sprinkler head which solves problems not presently addressed in the prior art.

It is another object of the present invention to provide a new adjustable sprinkler head which may be easily and efficiently manufactured and marketed.

It is a further object of the present invention to provide a new adjustable sprinkler head which is of a durable and reliable construction.

An even further object of the present invention is to provide a new adjustable sprinkler head which is susceptible of a low cost of manufacture with regard to both materials and labor, and which accordingly is then susceptible of low prices of sale to the consuming public, thereby making such adjustable sprinkler head economically available to the buying public.

Still yet another object of the present invention is to provide a new adjustable sprinkler head which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevation view of the adjustable sprinkler head system comprising the present invention.

FIG. 2 is a front elevation view illustrating a sprinkler head in a raised position.

DESCRIPTION OF PREFERRED EMBODIMENTS

Figure 3:
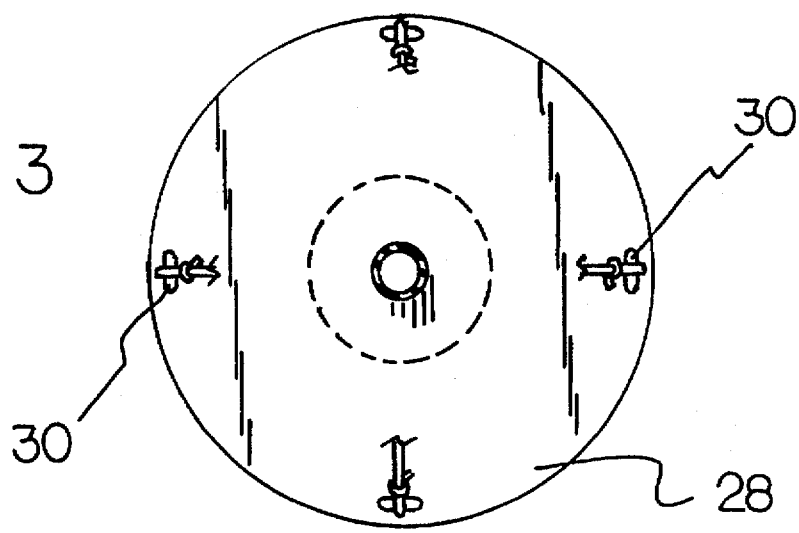
FIG. 3 is a cross-sectional view of the invention as viewed along the line 3—3 in FIG. 1.

With reference now to the drawings, and in particular to FIGS. 1-4 thereof, a new adjustable sprinkler head embodying the principles and concepts of the present invention and generally designated by the reference numeral 10 will be described.

Figure 4:
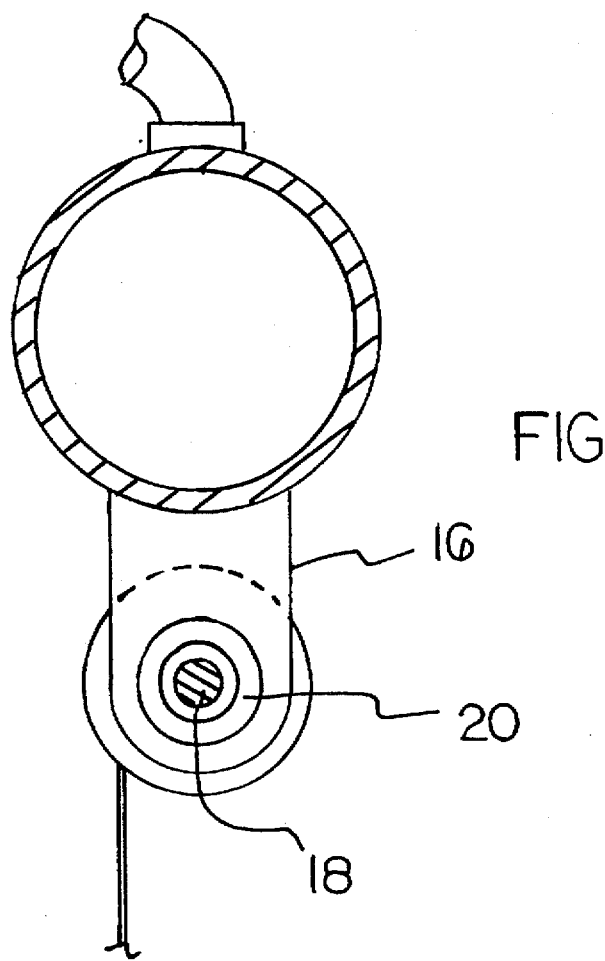
FIG. 4 is a cross-sectional view of the invention as viewed along the line 4—4 in FIG. 2.

More specifically, it will be noted that the adjustable sprinkler head system 10 is utilizable on a conventional center pivot irrigation system generally designated by the reference numeral 12 and having a conventional main water supply line 14 associated therewith. The present invention 10 employs the use of a plurality of downwardly extending brackets, each of which is generally designated by the reference numeral 16, with such brackets being fixedly secured to a bottom side of the main water line 14. The length of elongated solid metal rod 18 is positioned through the aligned bracket 16 and is retained therein by circular race bearings 20 as best illustrated in FIG. 4. This mounting of the rod 18 through aligned race bearings 20 facilitates an efficient rotational movement of the rod as desired in either a clockwise or counter-clockwise direction.

The invention 10 further includes a plurality of water dispensing sprinkler heads, each of which is generally designated by the reference numeral 22, and each of which is designed to receive a supply of water through a flexible conduit 24 attached to a connector 26 located on the top of the main water line 14 wherein such connector 26 facilitates fluid communication between the water supply within the main water line and the associated sprinkler head 22.

Each sprinkler head 22 is fixedly secured to a circular plate member 28, and each plate member is provided with four eye bolts 30 which are positioned about the periphery of the plate in a symmetrical and equidistant manner. Each eye bolt 30 is designed to have a load bearing cable 32 attached thereto, whereby four cables are directed upwardly from the plate 28 towards the rotatable rod 18. The remaining free ends of the cables 32 are individually wound around small spools, each of which is generally designated by the reference numeral 34. As shown in FIGS. 1 and 2, four individual spools 34 are fixedly attached to the rod 18 and are in a close abutting relationship, with each spool being designed to have one of the four cables 32 wound thereabout. As such, when the rod 18 is rotated in one direction, the cables 32 will be wound around their respective spools 34 so as to effectively raise the associated sprinkler head 22 upwardly inasmuch as it is fixedly secured to the circular plate 28. Eventually, a sprinkler head 22 can be raised to the point that it is almost in abutment with the pulleys 34 as illustrated in FIG. 2. An opposite rotation of the rod 18 will allow an unwinding of the cables 32 so as to allow the sprinkler head 22 to be lowered downwardly towards the ground surface.

Figure 5:
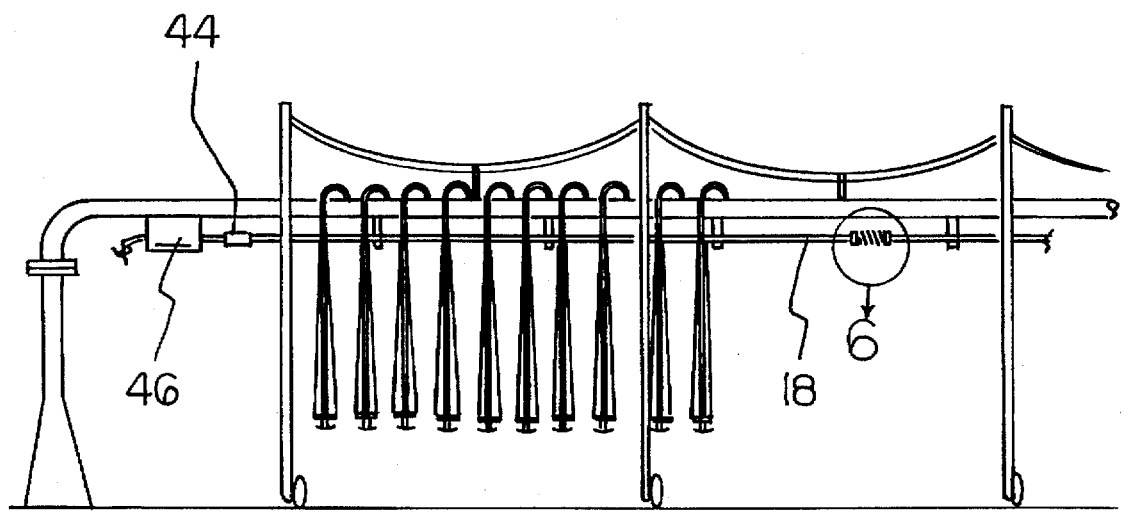
FIG. 5 is an elevation view of the invention illustrating the interconnection of sprinkler towers.
Figure 6:
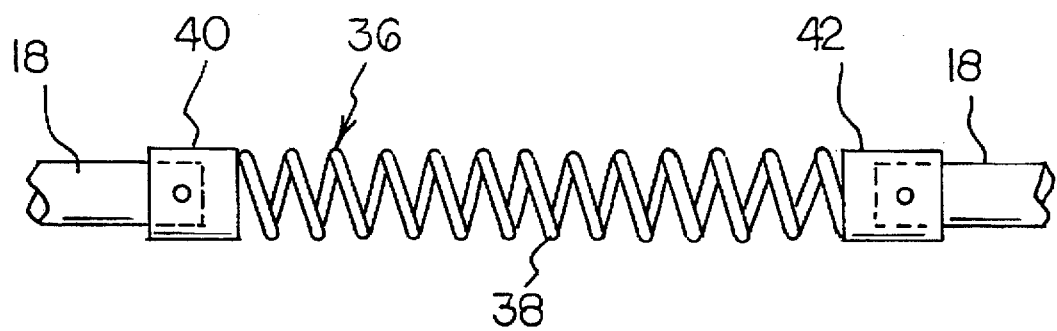
FIG. 6 is an enlarged detail view of the coupling used in the invention as taken from FIG. 5 of the drawings.

As shown in FIGS. 5 and 6, when it is desired to attach a plurality of conventional center pivot water towers together, it may be necessary to utilize a coupling 36 to attach a plurality of the rods 18 together. The coupling 36 essentially consists of a stiff and heavy duty coiled spring 38 having tubular shape couplers 40, 42 fixedly secured to opposed ends thereof, and these couplers are designed to be attached to ends of respective rods 18 as best illustrated in FIG. 6. If desired, a further coupler 44 as shown in FIG. 5 can be utilized to attach a rod 18 to an electric drive motor 46 or in the alternative, the motor drive could be replaced by a manually rotatable handle to achieve the desired clockwise or counter-clockwise rotation of the aligned rods 18. It can be envisioned that by rotating the bars 18, the cables 32 will wind up around it on the attached pulleys 34, thereby raising all of the sprinkler heads 22 at once, and with the bars joined by the spring couplings 36, sufficient transmission of torque from one bar to the other occurs smoothly while allowing for misalignment between the water towers as frequently occurs with these types of sprinkler systems.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved nozzle assembly for a center pivot irrigation system comprising in combination:

at least one sprinkler head;

sprinkler head support means to which the at least one sprinkler head is operably attached;

height adjustment means operably attached to said sprinkler head support means, the height adjustment means being operable to selectively raise and lower the at least one sprinkler head relative to a ground surface, the adjustment means having at least one cable attached to the sprinkler head support means, the at least one cable is selectively windable about a rotatable member, thereby to selectively raise and lower the at least one sprinkler head relative the ground surface;

the rotatable member having an elongated bar rotatably mounted along a length of water supply tubing forming a part of the center pivot irrigation system;

a coupling means attachable to a selected end of said elongated bar, said coupling means facilitating an interconnection of at least two elongated bars so as to extend an operable length thereof, whereby a plurality of sprinkler heads can be attached thereto, the coupling means being designed to transmit torque between the at least two elongated bars during a rotational movement of the at least two bars, the coupling means having a coiled spring section, the coil spring section functioning to transmit the torque while also compensating for misalignment between the at least two bars; and the rotatable member having at least one spool fixedly secured thereto, the at least one cable of the height adjustment means being selectively windable about the at least one spool, the rotatable member having an elongated bar rotatably mounted along a length of water supply tubing forming a part of the center pivot irrigation system, the at least one spool being fixedly secured to the elongated bar, the rotatable member having at least one other spool fixedly secured thereto, the rotatable member having at least one other cable being selectively windable about the one other spool, the at least one other spool being fixedly secured to the elongated bar.

\* \* \* \* \*